(12) United States Patent
Gneuss et al.

(10) Patent No.: US 6,168,399 B1
(45) Date of Patent: Jan. 2, 2001

(54) SHOT PISTON FOR MOLTEN PLASTIC MATERIAL

(75) Inventors: Detlef Gneuss; Hans-Otto Müller, both of Bad Oeynhausen (DE)

(73) Assignee: Gneuss Kunststofftechnik GmbH, Bad Oeynhausen (DE)

( * ) Notice: Under 35 U.S.C. 154(b), the term of this patent shall be extended for 0 days.

(21) Appl. No.: 09/359,953

(22) Filed: Jul. 22, 1999

(30) Foreign Application Priority Data

Jul. 24, 1998 (DE) .............................. 198 33 504

(51) Int. Cl.[7] ...................................... F04B 39/10
(52) U.S. Cl. ...................... 417/545; 164/315; 264/299
(58) Field of Search .................. 417/545; 164/303, 164/312, 315; 92/109, 110, 113, 181 R; 264/299, 319; 425/546, 556

(56) References Cited

U.S. PATENT DOCUMENTS

| | | | |
|---|---|---|---|
| 3,964,537 | * 6/1976 | Koch et al. ........................ | 164/136 |
| 5,052,468 | * 10/1991 | Koenig ................................ | 164/457 |
| 5,205,969 | * 4/1993 | Nett, Jr. et al. ..................... | 264/40.4 |
| 5,299,623 | * 4/1994 | Yaffe et al. ......................... | 164/316 |
| 5,632,321 | * 5/1997 | Hegel et al. ........................ | 164/315 |
| 5,660,223 | * 8/1997 | Thieman et al. .................... | 164/314 |

FOREIGN PATENT DOCUMENTS 3520454   12/1986  (DE) .

* cited by examiner

Primary Examiner—Teresa Walberg
Assistant Examiner—Thor Campbell
(74) Attorney, Agent, or Firm—Friedrich Kueffner

(57) ABSTRACT

A shot piston device for molten plastic material with a force-operated piston guided in a cylinder provided with an inlet and an outlet, wherein valve arrangements ensure that the cylinder is filled during the return stroke of the piston and the cylinder content is discharged during the work stroke of the piston. The piston is fixedly connected by a drive bolt to a differential piston arranged upstream or in front of the piston. At least in its rearward extreme position, the differential piston covers and closes the outlet arranged in the corresponding differential cylinder. The circumference of the piston has at least one groove located underneath the inlet and extending from the end face of the piston facing the differential piston. The length of the groove is shorter than the length of the piston. A closing ring is arranged so as to be axially slidable on a cylindrical portion of the drive bolt arranged in front of the end face of the piston facing the differential piston. The closing ring is capable of closing the groove relative to the pressure space.

7 Claims, 2 Drawing Sheets

SHOT PISTON FOR MOLTEN PLASTIC MATERIAL

BACKGROUND OF THE INVENTION

1. Field of the Invention

The present invention relates to a shot piston for molten plastic material with a force-operated piston guided in a cylinder provided with an inlet and an outlet, wherein valve arrangements ensure that the cylinder is filled during the return stroke of the piston and the cylinder content is discharged during the work stroke of the piston.

2. Description of the Related Art

Shot pistons of the above-described type are known, for example from DE 35 20 454 A1. They can be used for a variety of applications. The best known application is the injection molding of articles. In many cases, such arrangements are also used for cleaning plastic filters by backwashing. In both cases, the shot volume should remain constant in a predeterminable manner and it should not be necessary to use conventional valve arrangements with angles because they constitute dead spaces or corners in which molten plastic material can remain for uncontrollable periods of time. Because of the high temperature of the molten material, when molten material remains in the valves there is the danger of uncontrollable chemical changes of the plastic material. In the conventional shot pistons for molten plastic material, these valves make it possible to adjust the shot volumes, the flow velocity and frequently also the pressure required for the shot.

SUMMARY OF THE INVENTION

Therefore, it is the primary object of the present invention to provide a shot piston for molten plastic material of the above-described type in which unintentional transfers from the inlet to the outlet and from the outlet to the inlet are prevented, in which dead spaces in which quantities of molten plastic material could remain are avoided, and in which the shot volume, the flow velocity and the pressure of the material and the pressure pattern are adjustable in a reproducible manner, wherein a degree of filling of the cylinder is to be achieved which is proportional to the return stroke of the piston.

In accordance with the present invention, the piston is fixedly connected by means of a drive bolt to a differential piston arranged upstream or in front of the piston. At least in its rearward extreme position, the differential piston covers and closes the outlet arranged in the corresponding differential cylinder. The circumference of the piston has at least one groove located underneath the inlet and extending from the end face of the piston facing the differential piston. The length of the groove is shorter than the length of the piston. A closing ring is arranged so as to be axially slidable on a cylindrical portion of the drive bolt arranged in front of the end face of the piston facing the differential piston. The closing ring is capable of closing the groove relative to the pressure space.

As a result of the configuration of the present invention, the differential piston can be used to block or close the outlet after filling up to the beggining of the shot, and the cylinder can receive molten material during the return stroke along distances which can be absolutely blocked during the work stroke.

The various features of novelty which characterize the invention are pointed out with particularity in the claims annexed to and forming a part of the disclosure. For a better understanding of the invention, operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
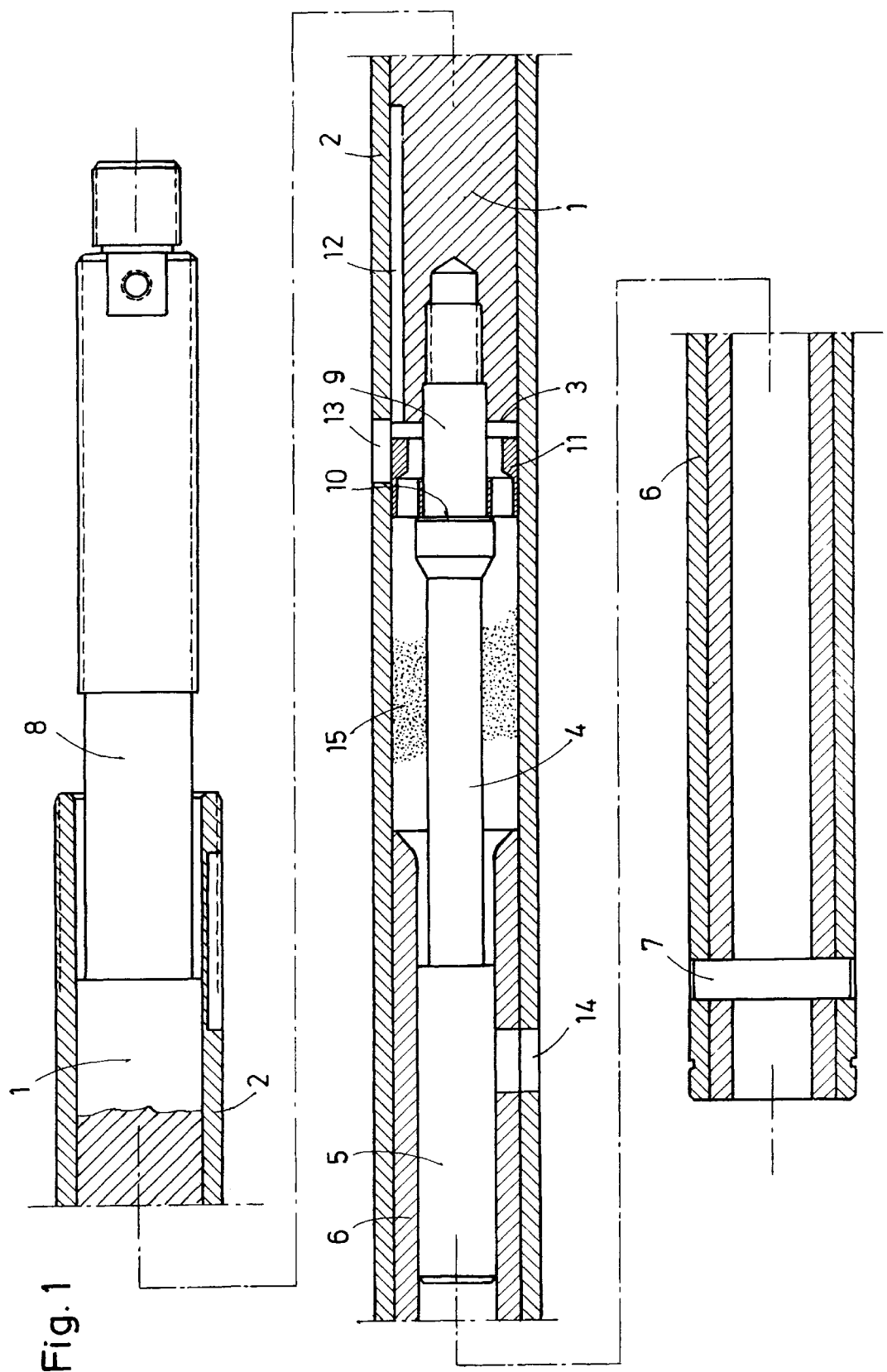
FIG. 1 is a longitudinal sectional view showing a shot piston for molten plastic material at the end of its return stroke in the cylinder.

FIG. 1 of the drawing shows in a sectional view a piston device at the end of the return stroke of the piston 1 in the cylinder 2. A drive bolt 4 extends from the end face 3 of the piston 1. The drive bolt 4 carries at its free end a differential piston 5 which is fitted into a differential cylinder 6 which, in turn, is constructed as a tube and is inserted into a portion of the cylinder 2 and is connected to the cylinder 2 through a cylindrical pin 7. The piston 1 receives at its rear side a shaft 8 through which it can be driven by means of a hydraulic cylinder, a crank, a pinon gear or a worm gear or the like, wherein this drive is not illustrated.

The drive bolt 4 has adjacent the end face 3 of the piston 1 a cylindrical portion 9, wherein a closing ring 11 is placed axially slidably on the cylindrical portion 9 up to the flange 10.

Extending in the outer surface of the piston 1 from the end face 3 is a groove 12 which is used as a draining groove. An inlet 13 extends through the cylinder 2 and an outlet 14 extends through the walls of the cylinder 2 and of the differential cylinder 6. During the return stroke of the two pistons 1 and 5, this outlet 14 is blocked and securely closed by the differential piston 5 shortly before the differential piston 5 reaches its extreme position.

Figure 2:
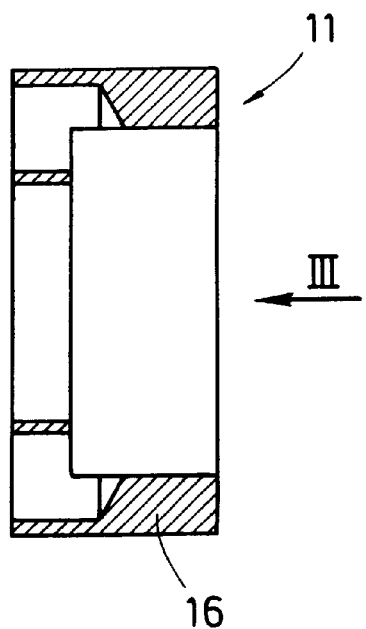
FIG. 2 is an axial sectional view, on a larger scale, showing the closing ring of FIG. 1.
Figure 3:
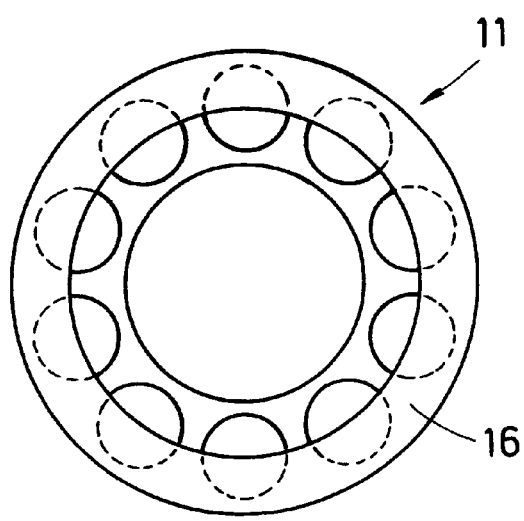
FIG. 3 is a front view of the closing ring of FIG. 2.

When the work stroke is started by shifting the pistons 1 and 5 toward the left as shown in FIG. 1, the differential piston 5 releases and opens the outlet 14 after a short travel distance of the differential piston 5. The molten plastic material 15 present between the pistons 1 and 5 is pushed against the edge of the differential cylinder 5 and is pressurized as a result of the decrease of the available cylinder space. This pressure forces the closing ring 11, shown on a larger scale in FIGS. 2 and 3, back onto the cylindrical portion against the piston 1. As a result, the end face of the outer bushing 16 of the closing ring covers the end face 3 of the piston at least up to the depth of the groove 12 and, thus, closes the front opening of the groove and, thus, any connection to the inlet 13. During the work stroke, the piston 1 pushes out the molten plastic material 15 with a pressure which corresponds to the force exerted on the shaft 8, wherein also the adjusting speed corresponds to the flow of molten material.

When the return stroke is started, the piston 1 and the differential piston 5 move toward the right in the position shown in FIG. 1. Already at the beginning of the movement, the pressure of the molten plastic material 15 present in the cylinder 2 has dropped and, under the influence of the pressure of the molten material supplied through the inlet 13 and penetrating into the groove 12, the closing ring 11 is lifted from the end face 3 of the piston 1 and, during the further return movement of the pistons 1 and 5, molten material flows continuously from the inlet 13 through the groove 12 and through the closing ring 11 into the cylinder space and continuously fills this cylinder space, so that pressure variations or extreme values of the pressure in the cylinder 2 as well as at the inlet 13 through which the molten material is fed are avoided. As already described, at the end of the return stroke, the differential piston 5 closes off the outlet 14, and the inlet 13 is also practically blocked because there are no further volume changes in the cylinder space downstream of the inlet 13.

Since the device no longer has dead spaces or curved corners, there no longer is the danger of changes in the hot molten plastic material.

It is frequently desirable to influence the rate at which the cylinder space is once again filled in order to compensate for different consistencies of the molten material. This can be achieved in a relatively simple manner by providing the groove 12 with several different cross-sections, wherein, by rotating the piston 1, the desired cross-section is placed underneath the inlet 13 and assumes the operative position.

While specific embodiments of the invention have been shown and described in detail to illustrate the inventive principles, it will be understood that the invention may be embodied otherwise without departing from such principles.

We claim:

1. A shot piston device for molten plastic material, comprising a force-operated piston guided in a cylinder provided with an inlet and an outlet, and valve arrangements for ensuring filling of the cylinder during a return stroke of the piston and a discharge of cylinder contents during a work stroke of the piston, further comprising a differential piston arranged in front of the piston and a drive bolt for rigidly connecting the differential piston to the piston, a differential cylinder surrounding the differential piston, wherein the differential piston blocks and closes at least in an extreme rear position thereof the outlet arranged in the differential cylinder, wherein the piston has a circumference defining a groove located under the inlet and starting from an end face of the piston facing the differential piston, wherein the groove has a length shorter than a length of the piston, wherein the drive bolt has a cylindrical portion in front of the end face, and a closing ring axially slidable arranged on the cylindrical portion for closing the groove relative to an interior of the cylinder.

2. The device according to claim 1, wherein the length of the groove is greater than a length of the work stroke.

3. The device according to claim 1, comprising a plurality of grooves having different cross-sections and arranged distributed over the circumference of the piston, wherein the piston is mounted so as to be rotatable such that one of the grooves can be placed under the inlet for effecting a communication between the inlet and the groove.

4. The device according to claim 1, wherein the closing ring comprises a sliding bushing guided on the cylindrical portion of the drive bolt.

5. The device according to claim 4, wherein the cylindrical portion of the drive bolt extends through a central opening of the closing ring.

6. The device according to claim 1, comprising a flange at an end of the cylindrical portion.

7. The device according to claim 1, wherein the differential cylinder is comprised of a separate pipe inserted into the cylinder, further comprising a bolt extending through the cylinder and the differential cylinder for securing the differential cylinder in the cylinder.

* * * * *